MECHANICAL INFORMATION STORAGE MATRIX

Filed Jan. 5, 1956 3 Sheets-Sheet 1

INVENTORS.
BENJAMIN M. DURFEE,
ALBERT D. MILLER &
BY FRANCIS O. UNDERWOOD
Campbell, Brumbaugh, Free & Graves
their ATTORNEYS.

INVENTORS.
BENJAMIN M. DURFEE,
ALBERT D. MILLER &
FRANCIS O. UNDERWOOD
BY Campbell, Brumbaugh, Free & Graves
their ATTORNEYS.

MECHANICAL INFORMATION STORAGE MATRIX

Filed Jan. 5, 1956 3 Sheets-Sheet 3

INVENTORS.
BENJAMIN M. DURFEE,
ALBERT D. MILLER &
FRANCIS O. UNDERWOOD
BY
Campbell, Brumbaugh, Free & Graves
their ATTORNEYS.

United States Patent Office 2,866,176
Patented Dec. 23, 1958

2,866,176

MECHANICAL INFORMATION STORAGE MATRIX

Benjamin M. Durfee, Binghamton, and Albert D. Miller and Francis O. Underwood, Vestal N. Y., assignors to International Business Machines Corporation, New York, N. Y., a corporation of New York Application January 5, 1956, Serial No. 557,583

16 Claims. (Cl. 340—173)

This invention relates to an information storage matrix and, more particularly, to such a matrix formed by switch elements angularly arranged along Cartesian co-ordinates.

In computers and similar systems it is necessary to store bits of information for indefinite periods of time. This may be accomplished by the use of electron tubes, cathode ray storage tubes, magnetic storage devices and other known elements. Most of these storage devices require energy to maintain the stored information. Furthermore, those that are passive often store information for only limited time intervals. Of course, it is most desirable to utilize storage matrices which will hold bits of information for an indefinite period without consuming any energy.

Accordingly, it is an object of the present invention to provide a passive matrix for storing information for an indefinite period without energy required to maintain such storage.

It is another object of the invention to provide a system of the above character in which some of the stored information may be removed and the remainder left standing in the matrix.

It is a further object of the invention to provide a system having the above characteristics in which the matrix elements are disposed in accordance with Cartesian co-ordinates.

It is yet another object of the invention to provide a storage matrix having the above characteristics in which the matrix elements include mercury or amalgam pool type switch elements selectively electrically connected by slidable conductors.

These and further objects of the present invention are accomplished by providing a number of angularly disposed column and value channels which include switch elements electrically joined in response to the movement of storage conductors. Each of these conductors is slidably received by a plurality of the switch elements and normally insulated from at least one of them. In addition, readout conductors are slidably carried by the switch elements.

The storage conductors are displaced a predetermined distance by movable slides in both the column and value channels, actuation of both of such slides being necessary in order to store information in any set of switch elements. At readout time the readout conductors may be suitably actuated to transfer stored information to external circuitry. Finally, reset driving means cooperate with the slides to return the storage conductors to their initial positions.

These and further objects and advantages of the invention will be more readily understood when the following description is read in connection with the accompanying drawings in which.

Figure 1:
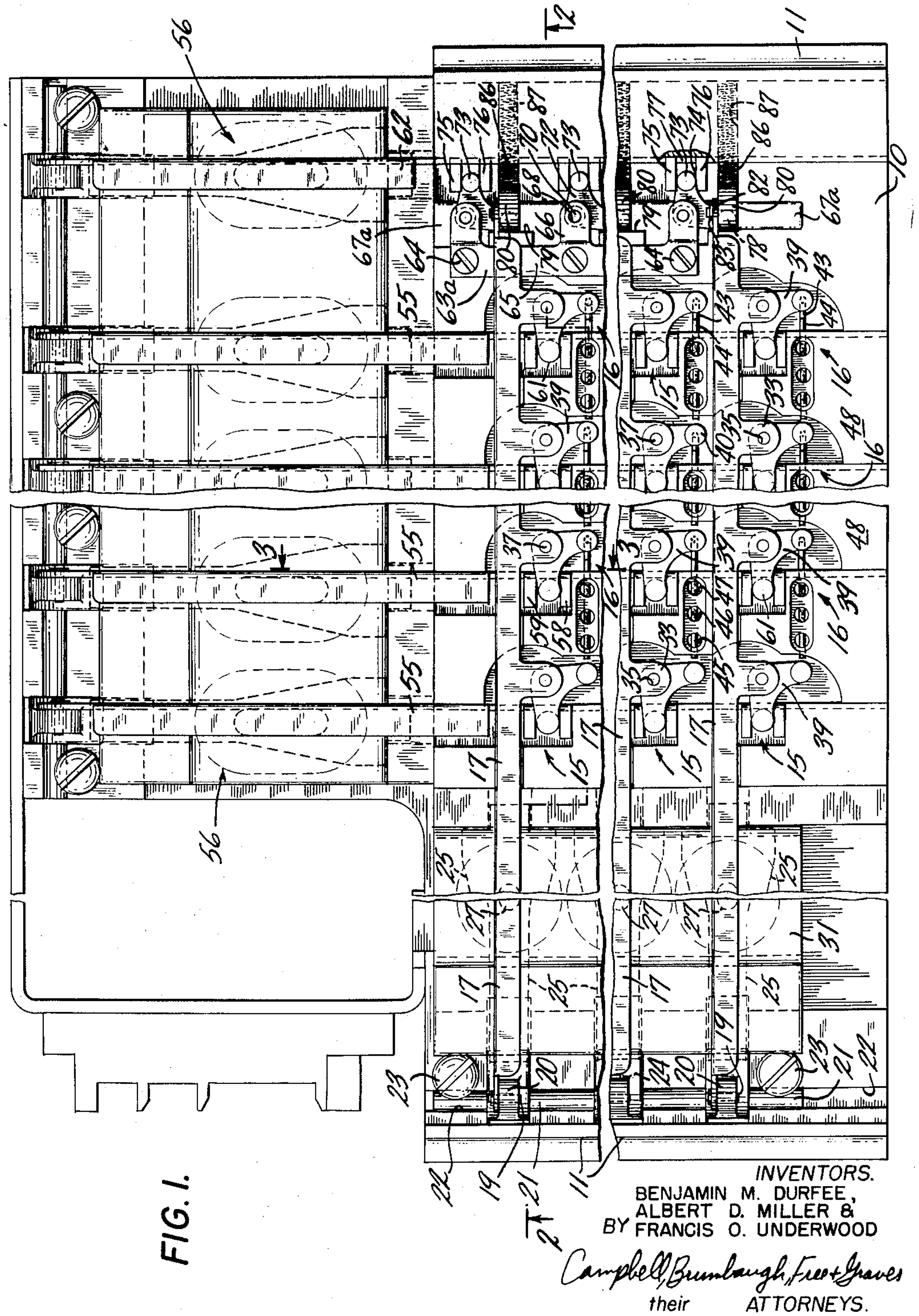
Figure 1 is a plan view with the cover removed of a storage matrix constructed in accordance with the present invention.
Figure 2:
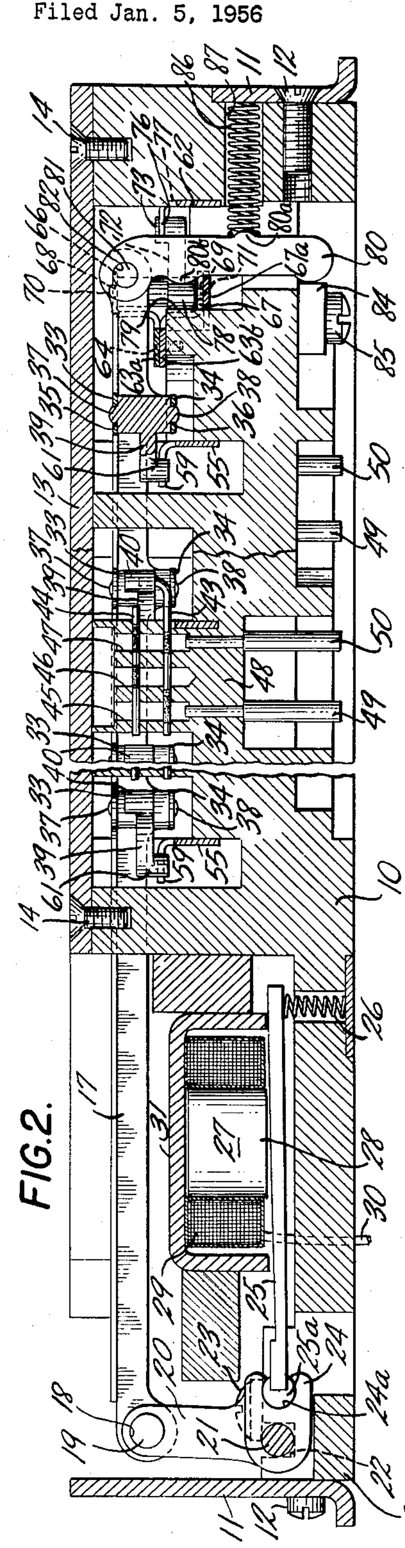
Figure 2 is a section of the matrix, somewhat enlarged, illustrated in Figure 1 taken on the view line 2—2 looking in the direction of the arrows.

Referring to the present invention in greater detail with particular reference to Figures 1 and 2, a supporting frame 10 carries a pair of mounting guide strips 11 secured by screws 12. A cover 13, omitted from Figure 1 for clarity, encloses the matrix mechanism and is fastened to the frame 10 by screws 14.

The storage matrix is generally composed of a plurality of value and column channels 15 and 16 angularly disposed in the frame 10. More particularly, each of the value channels includes a value slide 17 having an opening 18 at one extremity receiving a pivot stud 19 integral with a drive lever 20. A rod 21 journalling the other end of the lever 20 is secured in a recess 22 by the flanged heads of bolts 23. A stub extension 24 integral with and at right angles to the lever 20 is provided with a cylindrical recess *24a* which pivotally receives a slotted cylinder *25a* secured to an armature 25. A coil spring 26 under compression urges the end of the armature 25 remote from the lever 20 upwardly against a portion of a value electromagnet 27.

The armature 25 is actuated by the electromagnet 27 formed of a core 28 carrying a coil 29 energized via a cable 30, this structure being fastened to a yoke 31 suitably supported in the frame 10. It will be apparent that energization of the electromagnet 27 will pivot the armature 25 about one leg of the yoke 31, due to the spring 26 and, through the lever 20, displace the slide 17 to the left. Upon deenergization of the electromagnet 27, the slide 17 will be urged to the right and the armature 25 downwardly by mechanism to be discussed below.

Figure 4:
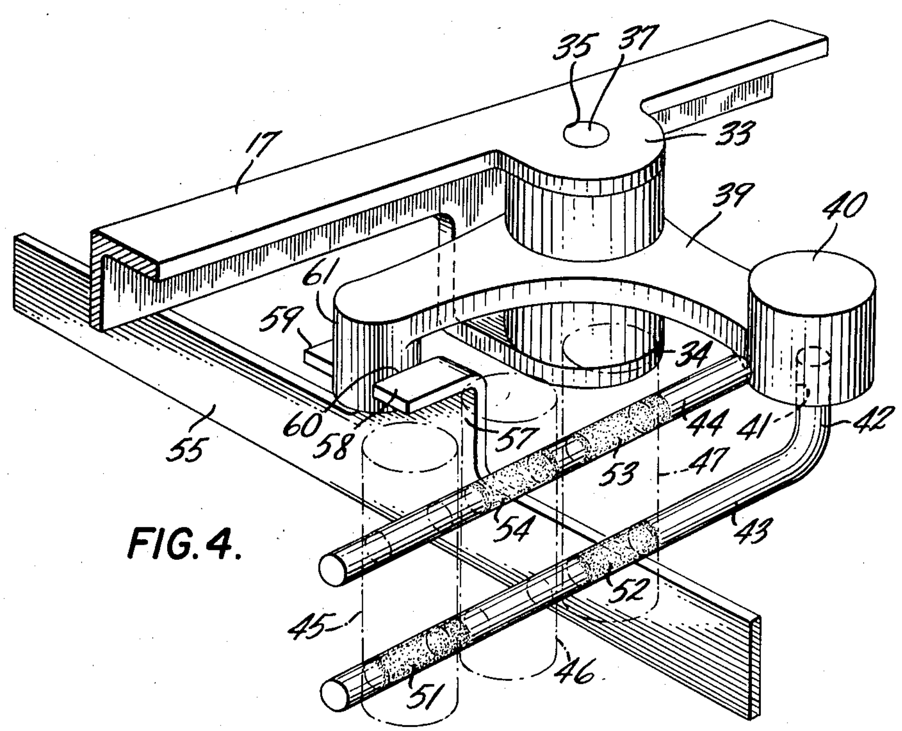
Figure 4 is a diagrammatic view in perspective illustrating the relationship of several operating elements in the matrix of Figure 1.

A pair of vertically spaced transversely extending arms 33 and 34 are carried by the slides 17 adjacent to their intersection with the column channels 16. Each of the arms 33 and 34 are formed with openings 35 and 36 respectively receiving pivot studs 37 and 38 of a bell crank 39. This construction is clearly illustrated in Figure 4, a boss 40 on one end of the bell crank 39 being provided with an opening 41 receiving a bent section 42 of a readout conductor 43. When the boss 40 is moved through a sufficient distance, it engages one end of a storage conductor 44, the conductors 43 and 44 being slidably carried by three switch elements 45, 46 and 47 containing mercury or amalgam pools *45a*, *46a* and *47a* in a suitable block 48. Contacts 49 and 50 extend from the switch elements 45 and 47 to positions under the frame 10 to facilitate connection to appropriate external circuitry.

Figure 6:
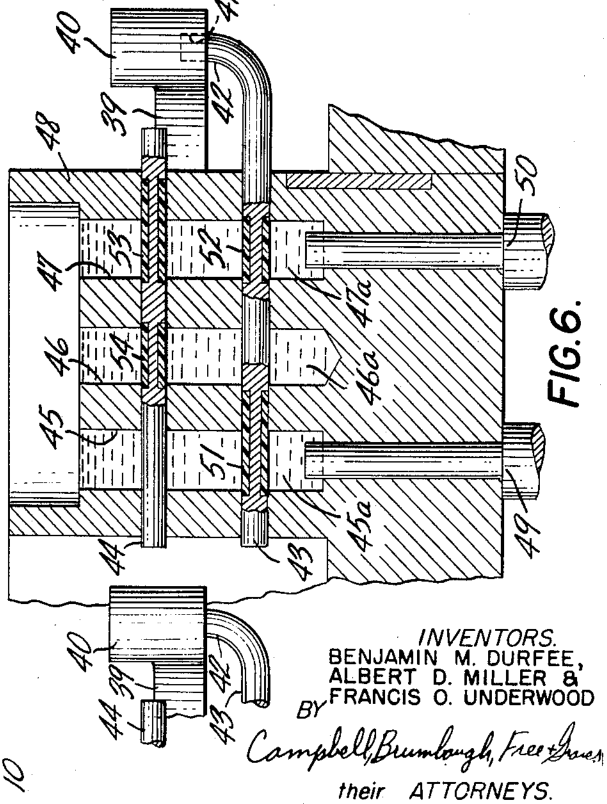
Figure 6 is a portion of the section of Figure 2, greatly enlarged, illustrating the switch elements and sliding conductors utilized in the storage matrix of Figure 1.

The mode of operation of the switch elements 45, 46 and 47 and the conductors 43 and 44 will be readily understood after an examination of Figure 6. The readout conductor 43 is provided with insulation 51 along one section to preclude electrical contact with the mercury pool *45a*, a second shorter section of this conductor also being provided with insulation 52 normally protecting it from contact with the mercury pool *47a*. The mercury pool *46a* is in constant electrical contact with the conductor 43.

The storage conductor 44 carries insulation 53 and 54 on two sections to preclude its electrical engagement with the mercury pools 47*a* and 46*a*, respectively. It will be observed that the insulation section 53 extends to the right a sufficient distance so that a slight leftward movement of the storage conductor 44 will not connect it to the switch element 47.

Figure 3:
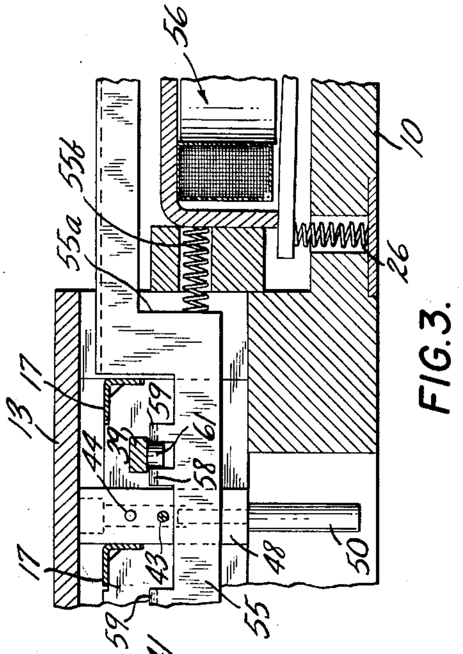
Figure 3 is a partial section, somewhat enlarged, of the matrix of Figure 1 taken on the view line 3—3 looking in the direction of the arrows.

Considering next the elements found in each of the column channels 16, a column slide 55 may be axially moved by a column electromagnet 56 (Figure 3) through a linkage identical with that disclosed in connection with the electromagnet 27, this structure not being described again in the interests of brevity. Each of the column slides 55 are provided with an angled section 55*a* to permit their passage under the value slides 17. Coil springs 55*b* bearing against the angled sections 55*a* serve to return the slides 55 to their initial positions after actuation by the column electromagnets 56.

Flanges 57 (Figure 4) are formed on the column slides 55 adjacent to the intersection of each of the value and column channels 15 and 16, a pair of spaced laterally extending fingers 58 and 59 extending from each of the flanges 57 and defining a notch 60 therebetween. As clearly illustrated in Figure 4, a downwardly projecting boss 61 on an arm of the bell crank 39 is received by the notch 60. Therefore, movement of the column slide 55 results in rotation of the bell crank 39.

Along one edge of the matrix parallel to the column channels 16 extends resetting elements. More particularly, a resetting slide 62, similar to the column slides 55, is driven by an electromagnet 56 through the same linkage used to drive the column slides 55. Supporting members 63*a* and 63*b* (Figure 2) parallel to the slide 62 are fastened to the frame 10 by means of screws 64. Integral with the members 63*a* and 63*b* are upper and lower angled arms 66 and 67 formed with openings 68 and 69 respectively receiving pivot studs 70 and 71 on a reset bell crank 72. A supporting strip 67*a* extending below the ends of the arms 67 lends support and rigidity to these members, the strip 67*a* being secured to the frame 10 and the arms 67 in any desired manner.

One end of each of the bell cranks 72 carries a boss 73 received by a slot 74 formed between a pair of fingers 75 and 76 extending from vertical flanges 77 on the slide 62 adjacent to each of the value channels 15. The other end of the bell crank 72 also carries a boss 78 projecting downwardly and normally resting against a vertical surface 79 of the frame 10.

A reset control arm 80 (Figure 2) at the end of each value channel 15 carries on its upper end a pivot stud 81 received in an opening 82 formed at the end of each of the value slides 17, a collar 83 on the end of the stud 81 securing these elements together. The lower end of each of the reset control arms 80 engages a stop 84 secured to the frame 10 by a screw 85. A coil compression spring 86 received in a recess 87 in the frame 10 is secured in position against the arm 80 by a protrusion 80*a*. A further protrusion 80*b* on the control arm engages the boss 78 of the bell crank 72. It will be evident that the springs 86 will return the slides 17 to their initial positions after actuation by the electromagnets 27.

In a typical operation of the above described embodiment of this invention, it will be assumed that it is desirable to store information corresponding to value 1, the lower channel 15 in Figure 1 of the drawing, and column 4, the fourth column channel from the right hand side of the device, in the information storage matrix. Accordingly, the corresponding value electromagnet 27 is energized resulting in a left hand movement of the selected value slide 17 and its associated bell cranks 39. It will be observed that at this time, the reset control arm 80 will pivot about the protrusion 80*b* against the spring 86 (Figure 2). Either before or during energization of the electromagnet 27, the electromagnet 56 in the lower column channel 16 is energized to shift the column slide 55 upwardly resulting in a rotary movement of its associated bell cranks 39.

Figure 5:
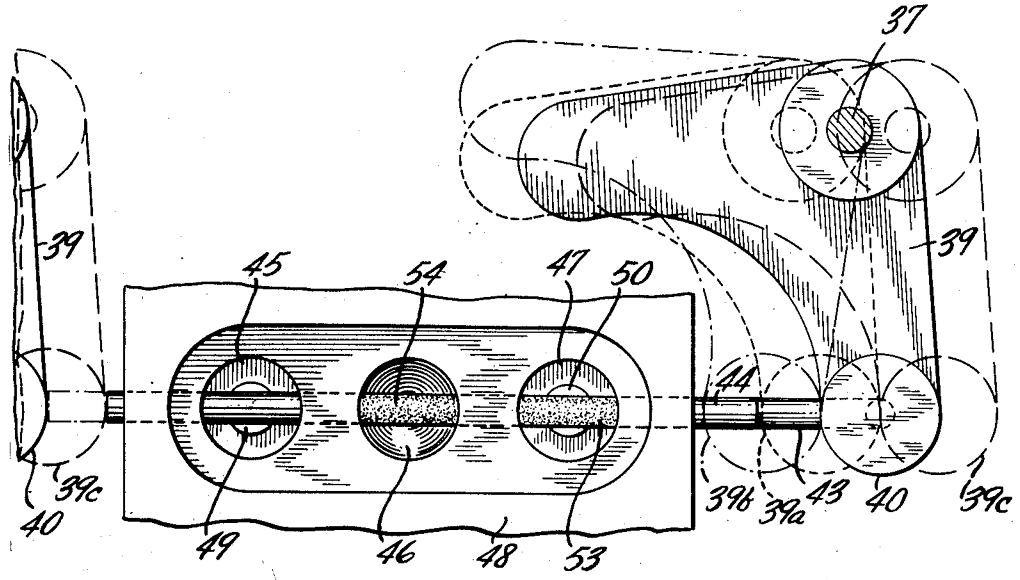
Figure 5 is a fragmentary view, greatly enlarged, showing the displacement under different conditions of elements in the matrix of Figure 1.

To better understand the above operation, reference should be made to Figure 5 in which the bell crank 39 is shown together with the readout and storage conductors 43 and 44 and the switch elements 45, 46 and 47. Operation of the associated value slide 17 will serve to shift the bell crank 39 to a broken line position 39*a* just short of engagement with the storage conductor 44. If the associated column slide 55 is now actuated with the bell crank in the position 39*a*, it will assume a new position indicated by broken lines 39*b*, the movement of the actuating boss 40 being sufficient to slide the storage member 44 to the left a substantial distance. Of course, the column slide 55 may be actuated first and followed by operation of the value slide 17 or both of the slides may be simultaneously operated.

When the storage conductor 44 is engaged and moved by the boss 40 of the bell crank 39, the insulating section 54 will no longer electrically isolate the conductor 44 from the mercury pool 46*a* and accordingly, the switch elements 45 and 46 will be electrically connected.

In order to selectively read information out of the information storage matrix, a selected one of the electromagnets 27 or 56 may be energized to slide the readout conductor 43 and electrically join the mercury pools 46*a* and 47*a*. At this time, the contacts 49 and 50 will be joined to indicate to suitable external circuitry that information has been stored at this point in the matrix.

Of course, readout from a plurality of positions in the matrix may be accomplished by energizing a plurality of the value and/or column electromagnets 27 and 56.

To reset the storage matrix, the electromagnet 56 associated with the resetting slide 62 is energized, this operation shifting the slide 62 and rotating the bell crank 72 in a counter clockwise direction. Accordingly, the boss 78 on each of the bell cranks 72 will urge its associated reset control arm 80 to the right against the spring 86, the arm 80 pivoting on the stop 84. Accordingly, the value slides 17 will be moved to the right and the reverse sides of the boss 40 on each of the bell cranks 39 will engage and return operated storage conductors 44 to their initial positions. This is clearly shown in Figure 5 by the broken line positions 39*c* of the bell crank 39. Such shifting of the value slides 17 is permitted by their drive linkages by reason of the recesses provided under their armatures 25.

It is evident that other suitable resetting means may be utilized in connection with the present storage matrix such, for example, as individual electromagnets associated with each of the value slides 17 permitting independent resetting of portions of the matrix.

From the foregoing, it will be seen that an information storage matrix has been provided that will simply and efficiently store bits of information for any desired time intervals without maintenance energy requirements. Furthermore, such information may be read out of the matrix bit by bit or in toto.

It will be understood that the above described embodiments of the invention are illustrative only and modifications thereof will occur to those skilled in the art. For example, the bell cranks 39 may be pivoted on the column slides 55 and have their bosses 61 coupled to the value slides 17. Therefore, the invention is not to be limited to the specific apparatus disclosed herein but is to be defined by the appended claims.

We claim:

1. An information storage matrix comprising a plurality of storage conductors each slidably received by a grouped plurality of switch elements, each of said conductors normally being electrically joined to at least one of the elements and electrically insulated from at least one of the elements, an actuator for sliding each of said storage conductors into electrical contact with the switch element normally insulated therefrom, a plurality of movable value slides each coupled to a plurality of said actuators, means for independently moving each of said value slides to displace its associated actuators a first interval in the direction of movement of their associated storage conductors, a plurality of movable column slides angularly related to the value slides and each coupled to a plurality of said actuators, and means for independently moving each of said column slides to displace its associated actuators a second interval in the direction of movement of their associated storage conductors, said actuators engaging and sliding their associated storage conductors into electrical contact with the switch elements normally insulated therefrom when moved a distance equal to the sum of said first and second intervals.

2. Apparatus as defined in claim 1 in which a readout conductor is slidably received by each group of switch elements, said readout conductor normally being electrically joined to at least one of the elements and electrically insulated from at least one of the elements, each of said actuators sliding one of said readout conductors into electrical contact with the switch element normally insulated therefrom.

3. Apparatus as defined in claim 2 in which means are provided for resetting each of the storage conductors by reversing the movement of the actuators, said reverse movement urging the actuators against the storage conductors to slide them to their initial positions.

4. Apparatus as defined in claim 3 in which said switch elements comprise mercury pool type devices.

5. An information storage matrix comprising a plurality of storage conductors each slidably received by a grouped plurality of switch elements, each of said conductors normally being electrically joined to at least one of the elements and electrically insulated from at least one of the elements, an actuator for sliding each of said storage conductors into electrical contact with the switch element normally insulated therefrom, said actuator comprising one arm of a bell crank, a plurality of angularly related value and column slides, each of the bell cranks being pivoted on one of said value and column slides, the other arm of each of the bell cranks being coupled to the other one of said value and column slides, means for independently moving each of said value slides to displace the one arms of its associated bell cranks a first interval in the direction of movement of their associated storage conductors, and means for independently moving each of said column slides to displace the one arms of its associated bell cranks a second interval in the direction of movement of their associated storage conductors, said one arms of the bell cranks engaging and sliding their associated storage conductors into electrical contact with the switch elements normally insulated therefrom when moved a distance equal to the sum of said first and second intervals.

6. Apparatus as defined in claim 5 in which a readout conductor is slidably received by each group of switch elements, said readout conductor normally being electrically joined to at least one of the elements and electrically insulated from at least one of the elements, each of said one arms of the bell cranks selectively sliding one of said readout conductors into electrical contact with the switch element normally insulated therefrom.

7. Apparatus as defined in claim 6 in which means are provided for resetting each of the storage conductors by reversing the movement of the actuators, said reverse movement urging the rear side of the one arms of the bell cranks against the storage conductors to slide them to their initial positions.

8. Apparatus as defined in claim 7 in which the resetting means comprises a movable reset slide parallel to one of the value and channel slides, means for moving said reset slide, a reset bell crank adjacent to the other one of said value and column channels, means for coupling one arm of each of the reset bell cranks to the reset slide, a control arm coupled to the other slides, the other arm of each of said reset bell cranks engaging one of the control arms, and means for mounting the control arm to permit forward and reverse movement of the other slides, said other slides being urged in a reverse direction upon actuation of said control arms by the bell cranks in response to movement of the reset slide.

9. Apparatus as defined in claim 8 in which said switch elements comprise mercury pool type devices.

10. In an information storage matrix, a storage conductor slidably received by a plurality of switch elements, said conductor normally being electrically joined to at least one of the elements and electrically insulated from at least one of the elements, an actuator for sliding said storage conductor into electrical contact with the switch element normally insulated therefrom, said actuator comprising one arm of a bell crank, angularly related movable value and column slides, means for pivoting the bell crank on one of the value and column slides, means for coupling the other arm of said bell crank to the other one of said value and column slides, means for moving said value slide to displace the one arm of the bell crank a first interval in the direction of movement of its associated storage conductor, and means for moving said column slide to displace the one arm of the bell crank a second interval in the direction of movement of its associated storage conductor, said one arm of the bell crank engaging and sliding the storage conductor into electrical contact with the switch element normally insulated therefrom when moved a distance equal to the sum of said first and second intervals.

11. Apparatus as defined in claim 10 in which a readout conductor is slidably received by said switch elements, said readout conductor normally being electrically joined to at least one of the elements and electrically insulated from at least one of the elements, said one arm of the bell crank selectively sliding the readout conductor into electrical contact with the switch element normally insulated therefrom.

12. Apparatus as defined in claim 11 in which the switch elements comprise mercury pool type devices.

13. In an information storage matrix, a plurality of storage elements displaceable between first and second positions, an actuator to move each of the storage elements to its second position from its first position, a plurality of first members each coupled to a plurality of said actuators, means to move each of the first members independently to displace its associated actuators a first interval in the direction of movement of their associated displaceable elements, a plurality of second members each coupled to a plurality of said actuators, and means to move each of the second members independently to displace its associated actuators a second interval in the direction of movement of their associated displaceable elements, said actuators urging their associated storage elements from their first to their second positions when moved a distance equal to the sum of said first and second intervals.

14. Apparatus as defined in claim 13, in which means are provided to reset each of the storage elements by reversing the movement of the actuators, said reverse movement urging the actuators against the storage elements to return them to their first positions.

15. In an information storage matrix, a storage element displaceable between first and second positions, an actuator to move the storage element to its second position from its first position, said actuator comprising one arm of a bell crank, angularly related first and second movable members, the bell crank being pivoted on one of said first and second members, the other arm of the bell crank being coupled to the other one of said first and second members, means to move the first member independently to displace the one arm of the bell crank a first interval in the direction of movement of its associated displaceable element, and means to move the second member independently to displace the one arm of the bell crank a second interval in the direction of movement of its associated displaceable element, said one arm of the bell crank engaging and sliding its associated storage element from the first to the second position when moved a distance equal to the sum of said first and second intervals.

16. Apparatus as defined in claim 15, in which means are provided to reset the storage element by reversing the movement of the bell crank arm, said reverse movement urging the rear side of the arm against the storage element to return it to its first position.

References Cited in the file of this patent

UNITED STATES PATENTS 2,540,226 Williams ---------------- Feb. 6, 1951
2,660,628 Kilgen ---------------- Nov. 24, 1953